US011924919B2

(12) United States Patent
Stojanovski et al.

(10) Patent No.: US 11,924,919 B2
(45) Date of Patent: Mar. 5, 2024

(54) SELF-LEARNING UE CAPABILITY VERIFICATION FROM PARTIAL REPORTED CAPABILITIES

(71) Applicant: Apple Inc., Cupertino, CA (US)

(72) Inventors: Alexandre Stojanovski, Paris (FR); Sudeep Vamanan, Nuremberg (DE); Birgit Breining, Munich (DE); Michael Zitzmann, Nuremberg (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/309,284

(22) PCT Filed: Nov. 13, 2019

(86) PCT No.: PCT/US2019/061242
§ 371 (c)(1),
(2) Date: May 14, 2021

(87) PCT Pub. No.: WO2020/102397
PCT Pub. Date: May 22, 2020

(65) Prior Publication Data
US 2021/0409935 A1 Dec. 30, 2021

Related U.S. Application Data

(60) Provisional application No. 62/768,363, filed on Nov. 16, 2018.

(51) Int. Cl.
*H04W 8/22* (2009.01)
*H04W 64/00* (2009.01)

(52) U.S. Cl.
CPC ........... *H04W 8/22* (2013.01); *H04W 64/006* (2013.01)

(58) Field of Classification Search
None
See application file for complete search history.

(56) References Cited

U.S. PATENT DOCUMENTS 10,262,290 B1 * 4/2019 Mossoba .............. G06F 40/205
2013/0210385 A1 * 8/2013 Ahmed ............... H04W 12/069
455/434

FOREIGN PATENT DOCUMENTS

CN 105450663 3/2016
CN 107466032 12/2017
(Continued)

OTHER PUBLICATIONS

R2-1804336_Media Tek Inc._3GPP TSG-RAN WG2_Apr. 4, 2018. pdf (Year: 2018).*

(Continued)

*Primary Examiner* — Jinsong Hu
*Assistant Examiner* — Alexander J Yi
(74) *Attorney, Agent, or Firm* — Fay Kaplun & Marcin, LLP

(57) ABSTRACT

An apparatus of a node of a network comprises one or more baseband processors to process a first user equipment (UE) capability report from a first UE, and to process a second UE capability report from a second UE, wherein the first UE capability report and the second UE capability report include a same UE capability ID for the first UE and the second UE, and wherein the first capability report includes partial UE capability information for the first UE and the second capability report includes partial UE capability information for the second UE. The apparatus can include a memory to store the first capability report and the second capability report.

15 Claims, 7 Drawing Sheets

(56) References Cited

FOREIGN PATENT DOCUMENTS

| | | |
|---|---|---|
| CN | 107925870 | 4/2018 |
| JP | 3633546 B2 * | 3/2005 |
| WO | 2009/072956 | 6/2009 |
| WO | 2013/022310 | 2/2013 |
| WO | 2017/027057 | 2/2017 |
| WO | 2018-084544 | 5/2018 |

OTHER PUBLICATIONS

R2-1815429_NTT Docomo Inc._3GPP TSG-RAN2 Meeting #103bis_ Oct. 8, 2018.pdf (Year: 2018).*
Casati_WO_2020-001754A1.pdf (Year: 2020).*
MediaTek Inc., "UE capability compression through capability ID", R2-1804336, 3GPP TSG-RAN WG2, Apr. 4, 2018.
Vivo, "Segmentation awareness in UE and Network", R2-1816430, 3GPP TSG-RAN WG2, Nov. 2, 2018.
Apple, "Optimization on UE radio capability signaling", R2-1815061, 3GPP TSG-RAN WG2, Sep. 28, 2018.
Catt, "Discussion on the relation of the capability ID to specific capability containers", R2-1816949, 3GPP TSG-RAN WG2, Nov. 2, 2018.

* cited by examiner

SELF-LEARNING UE CAPABILITY VERIFICATION FROM PARTIAL REPORTED CAPABILITIES

CROSS-REFERENCE TO RELATED APPLICATIONS

The present application claims the benefit of U.S. Provisional Application No. 62/768,363 filed Nov. 16, 2018. Said Application No. 62/768,363 is hereby incorporated herein by reference in its entirety.

BACKGROUND

In a self-learning user equipment (UE) capability verification method, the network asks the UE to transfer its capabilities and the capability ID over the air and builds a dictionary of Capability ID capabilities. There may be situations, however, when the UE is transferring only a subset of its capabilities. The self-learning algorithm should be adaptive to deal with these partial capabilities.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
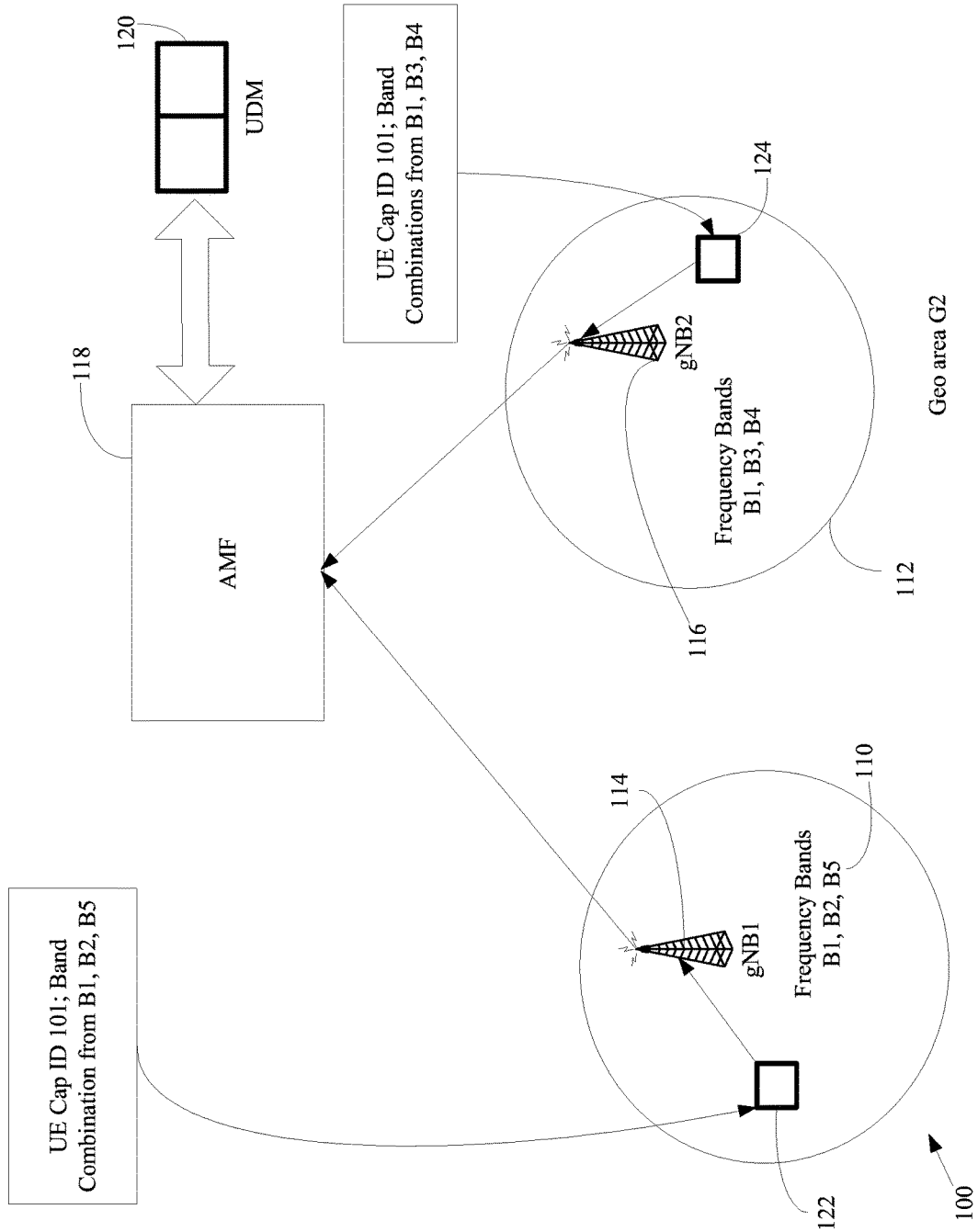
FIG. 1 is a diagram of example geographical areas deploying different bands in a PLMN in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of example geographical areas deploying different bands in a PLMN in accordance with one or more embodiments will be discussed. An identifier (ID) based capability management approach is being considered by The Third Generation Partnership Project (3GPP) for Release 16. In some examples, a user equipment (UE) advertises a capability ID or a device specific ID, and the network will have the mapping between the ID advertised by the UE and the UE capabilities the advertised ID stands for. The mapping can be provisioned offline in the network through the Operations and Maintenance Center in the network as an example. Such a mapping or a dictionary also can be built by the network through a self-learning process wherein the UE capability and the ID is retrieved from the devices over the air. Once a pre-defined number of UEs advertising the same capability ID have reported the same UE capability, the UE capability can be declared "validated". When subsequently a UE advertises a capability ID that has been validated, the network retrieves the UE capability from the dictionary stored in a network database, instead of acquiring it from the UE over the radio.

It has been observed for Fourth Generation (4G) and Fifth Generation (5G) wireless networks that an exponential increase in the number of radio-frequency (RF) bands and associated band combinations for carrier aggregation or multi-connectivity operations is the main contributor for increasing the size of UE capabilities. A given network may have a huge number of bands or band combinations deployed nationwide, but there may be regional differences in the bands used or features deployed, for example four Layer multiple input, multiple output (MIMO) and higher Modulation orders. Thus, a group of next generation nodeBs (gNBs) in a given geographical area may need only a relevant subset of UE capability information to be stored in the access network level "UE context".

FIG. 1 shows an example considering deployment of different bands in different areas of a public land mobile network (PLMN) 100. The example of FIG. 1 can also be extended for different features in different areas of a PLMN. In PLMN 100 shown in FIG. 1, there are two geographical areas, Geo area G1 110 and Geo area G2 112 each having one or more of gNBs or access network nodes. Access and Mobility Management Function (AMF) 118 can control gNB1 114 and gNB2 116 and can connect with Unified Data Management (UDM) server 120. Geo area G1 110 includes gNB1 114 which is one access network node in G1, and Geo area G2 112 includes gNB2 116 which is one access network node in G2. Geo area G1 110 can deploy band B1, B2, and B5, and Geo are G2 112 can deploy bands B1, B3, and B4. When UE 122 is in Geo area G1 110, UE 122 can transmit its UE Capability ID 101 to gNB1 114 that indicates UE 122 can operate on combinations of bands from bands B1, B2, and B5. When UE 124 is in Geo area G2 116, UE 124 can transmit its UE Capability ID 101 to gNB2 116 that indicates UE 124 can operate on combinations of bands B1, B3, and B4.

Figure 2:
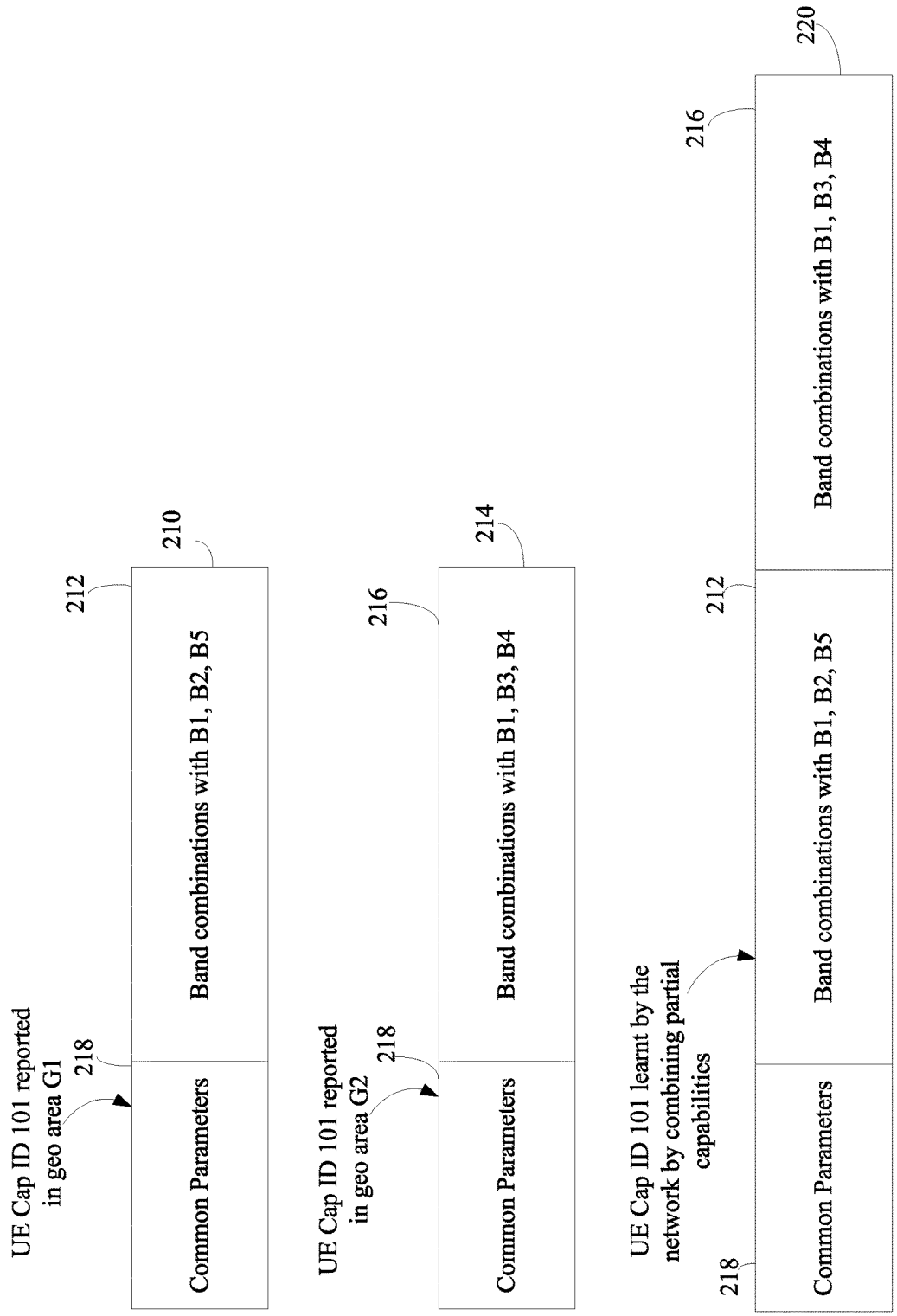
FIG. 2 is a diagram of building a complete UE Capability from reported capabilities in accordance with one or more embodiments.

Referring now to FIG. 2, a diagram of building a complete UE Capability from reported capabilities in accordance with one or more embodiments will be discussed. Some networks can employ filtering techniques to request the UE 122 to give preference to relevant band combinations in the "UE capability" message that the UE 122 sends to the network. In an example where different features are deployed in different geographical areas, the filters would be for these different features. Thus, applying this information in the example shown in FIG. 1 to the diagram of FIG. 2, there are two UEs of the same model, UE 122 having UE Capability ID 101 and UE 124 also having UE Capability ID 101. Thus, both UE 122 and UE 124 have the same configured UE Capability ID 101. UE 122 in Geo G1 110 provides a first report to gNB1 114 regarding the band combinations 212 used by UE 122 according to its reported UE Capability ID 101 according to filter rules, along with common parameters 218. UE 124 in Geo area G2 112 provides a second report 214 to gNB 116 regarding the different band combinations used by UE 124 according to its reported UE Capability ID 101 under filter rules, also along with common parameters 218. Under filter rules, a UE can report only a subset of the bands which it is capably of using according to the bands that are available to be used in a selected geographical area. It should be noted that two UEs of the same model or having the same UE Capability ID will report same capabilities from the same geographical area.

The UE capabilities received from the two or more UEs can then be provided by the respective gNBs to the core network entity AMF 118 which is responsible for storing the UE capabilities. In some examples, the AMF 118 can store the UE capabilities in UDM server 120 or in a stand-alone database. A network entity such as AMF 118 and/or UDM server 120 can use a process such as a self-learning algorithm to build a dictionary for UE Capability ID 101 based on two partially overlapping UE capabilities octets from the two UEs, UE 122 and UE 124.

The self-learning algorithm can be configured to not to consider receiving two partially overlapping UE capability sets as an error scenario. In some examples, the algorithm is provided with the additional information that each UE capability string represents only a partial UE capability for UE Capability ID 101. As a result, the network entity executing the algorithm can compare common parameters and merge the disjointed band combination information such as partial capabilities received from UEs in different geographical areas. With the knowledge about the different geographical areas the self-learning algorithm builds a complete UE capability set 220 from information obtained from the two UEs each in two different geographical areas. As shown in FIG. 2, a complete capability set 220 can comprise the first set of band combinations 212 reported in area G1, and the second set band combinations 216 reported in area G2. It should be noted that although two UE capability reports are shown, one from each geographical area, there may be any number of geographical areas and further there may be any number of available bands and band combinations such that multiple UE capability reports from multiple geographic areas may be combined until every combination of band or band combinations are determined to exist in the complete capability set 220. Optionally, the filters used in the geographical areas can be another input provided to the algorithm. Once the complete set is reached, then a given UE with the given unique UE capability ID such as UE Capability ID 101 may no longer need to provide any further UE capability reports since the network 100 already as the complete UE capability set 220 for that particular model of UE, although the scope of the disclosed subject matter is not limited in this respect.

As can be seen from the example above, that two pieces or sets of information can enhance the ability of a self-learning algorithm to deal with partial UE capabilities received from UEs in different geographical areas. The first piece of information is the primarily knowledge that the reported UE capability is a partial UE capability so that the self-learning algorithm can compare two partial UE capabilities and merge them accordingly. For example, if two partial UE capability sets include the same frequency band, then that band can be listed only once in the complete UE capability set 220 and does not need to be repeated in the UE capability set. The second piece of information is knowledge about the geographical area from which a given UE is reporting its capabilities can be applied in the algorithm to run a validation phase for each geographical area separately. This information can be supplemented by an optional input of band and/or feature filters applied by the gNB or access node while retrieving the UE capability information from the UE.

Figure 3:
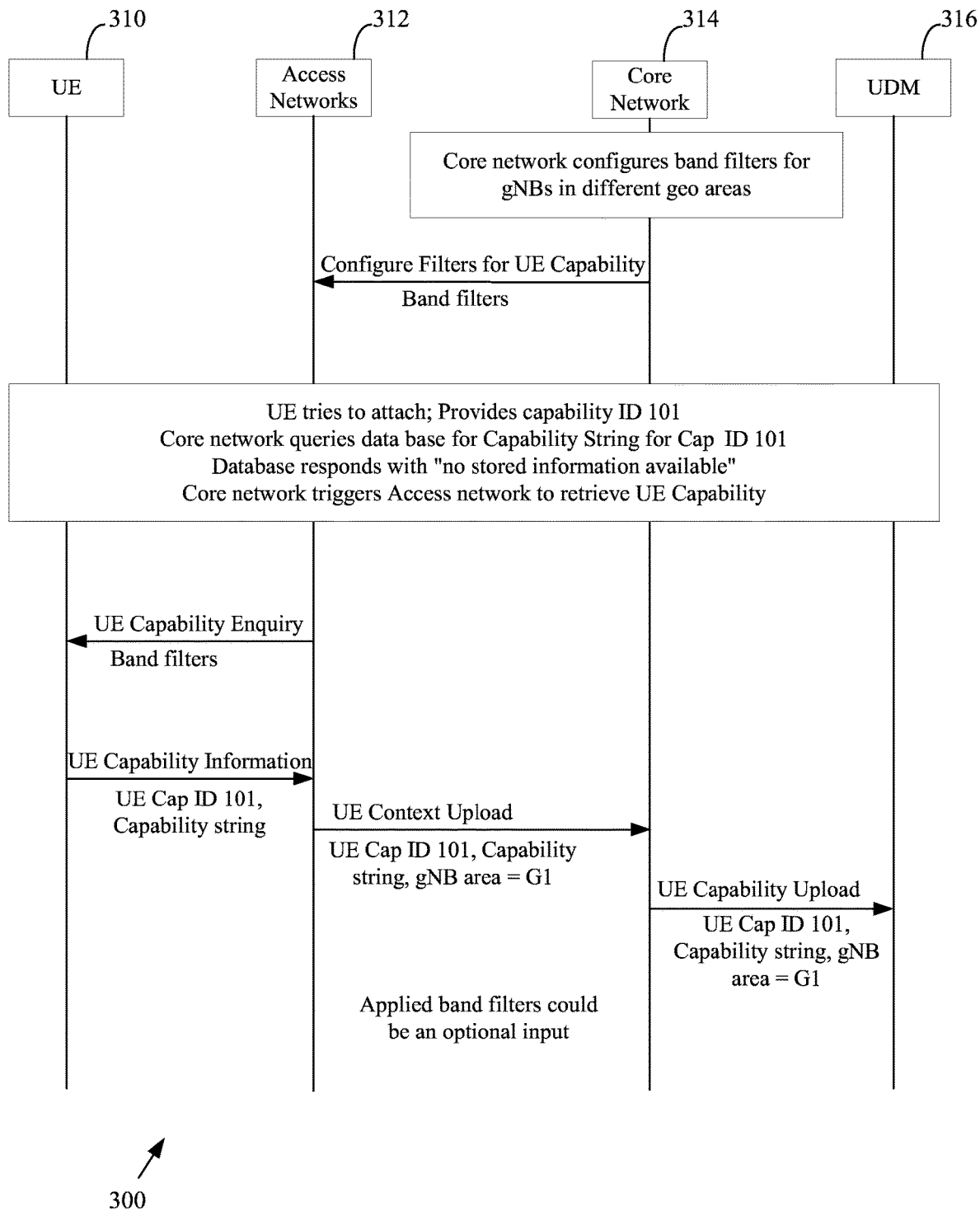
FIG. 3 is a diagram of a partial tag added by a Core Network in accordance with one or more embodiments.

Referring now to FIG. 3, a diagram of a partial tag added by a Core Network in accordance with one or more embodiments will be discussed. Various options can be utilized for reporting the UE capability information from a UE to the network. FIG. 3 shows a first embodiment 300 in which the core network 314 can configure the band filters for the access the network 312 in different geographical areas.

The first part of the message sequence chart shows the interactions while the UE 310 is trying to attach to the network. The UE capability ID 101 does not throw up a match in the database of the core network 314, for example UDM server 316, and hence the core network 314 requests access network 312 to retrieve the UE capability over the air from the UE 310. The access network 312 includes the band filters in the UE Capability Enquiry to the UE. UE reports back its capability string along with its capability ID 101. When the access network 312 uploads the UE context to the core network 314, the access network 312 tags the UE capability string with the geographical area information G1 from which it was retrieved. Since the core network 314 has configured the band filters for the access network 312, the core network 314 includes the additional metadata that the reported UE capability is a partial one while seeding the self-learning algorithm for the UDM server 316.

In this first embodiment 300 of FIG. 3, the geographical area information can be added by the access network 312. The "partial" tag indicating partial UE capability information, and optionally applied band filters information, can be added by the core network 314. In an alternative to embodiment 300, the geographical area information can be derived by the core network 314 from the knowledge about the gNB that is uploading the UE context, for example from the known location of the gNB.

Figure 4:
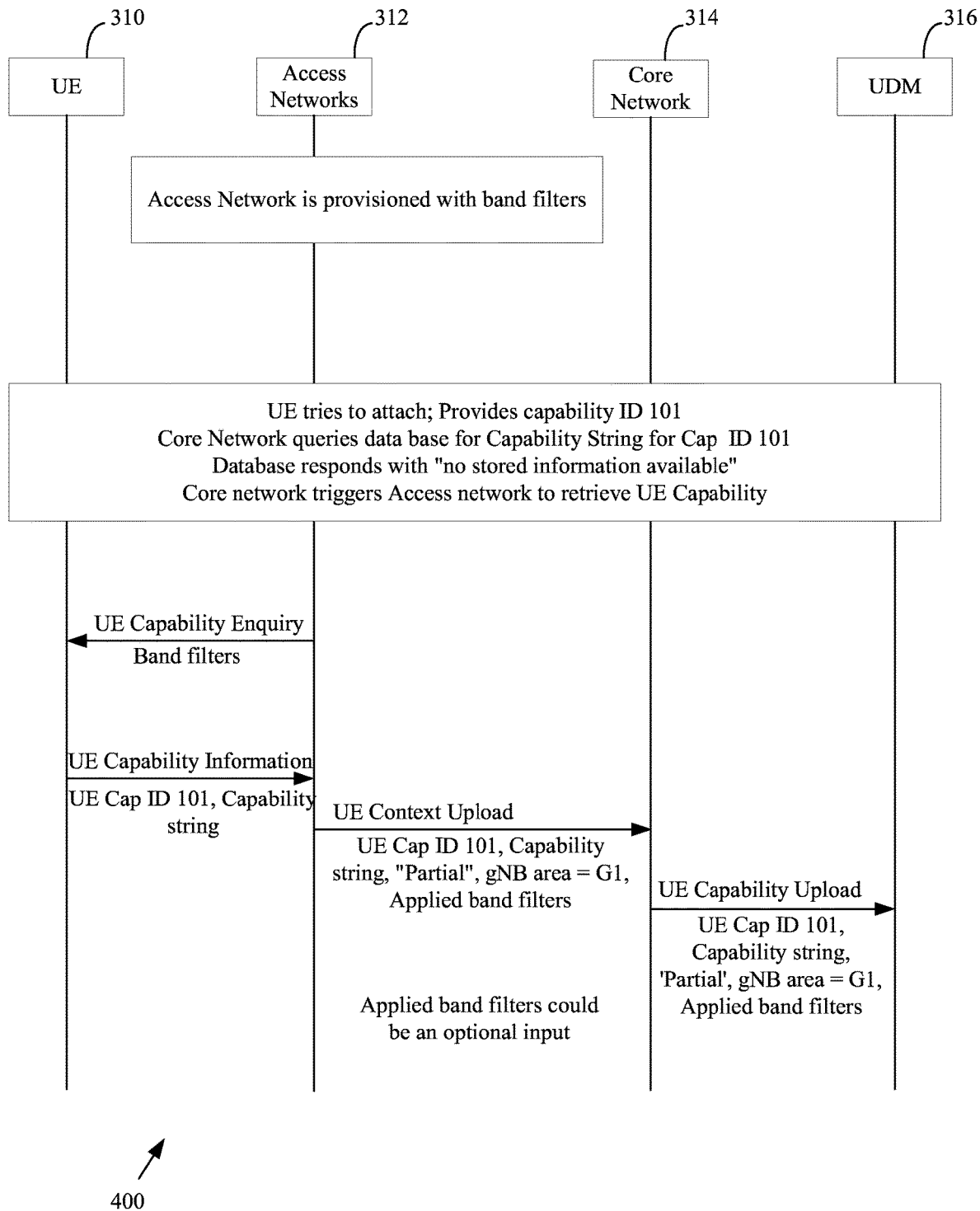
FIG. 4 is a diagram of a partial tag added by the Access Network in accordance with one or more embodiments.

Referring now to FIG. 4, a diagram of a partial tag added by the Access Network in accordance with one or more embodiments will be discussed. FIG. 4 shows a second embodiment 400 wherein the access network 312 is provisioned with the band filters, for example by the network Operations and Maintenance Center.

In this embodiment 400, the geographical information and the "partial" tag can be added to the reported UE capability information by the access network 312 while uploading the UE context. As an additional embodiment, the applied band filters can also be added by the access network 312 to the uploaded UE context. In an alternative to embodiment 400, the partial tag and the applied band filters can be added by the access network 312, and the geographical area information can be added by the core network 312 as described with respect to FIG. 3, above.

Figure 5:
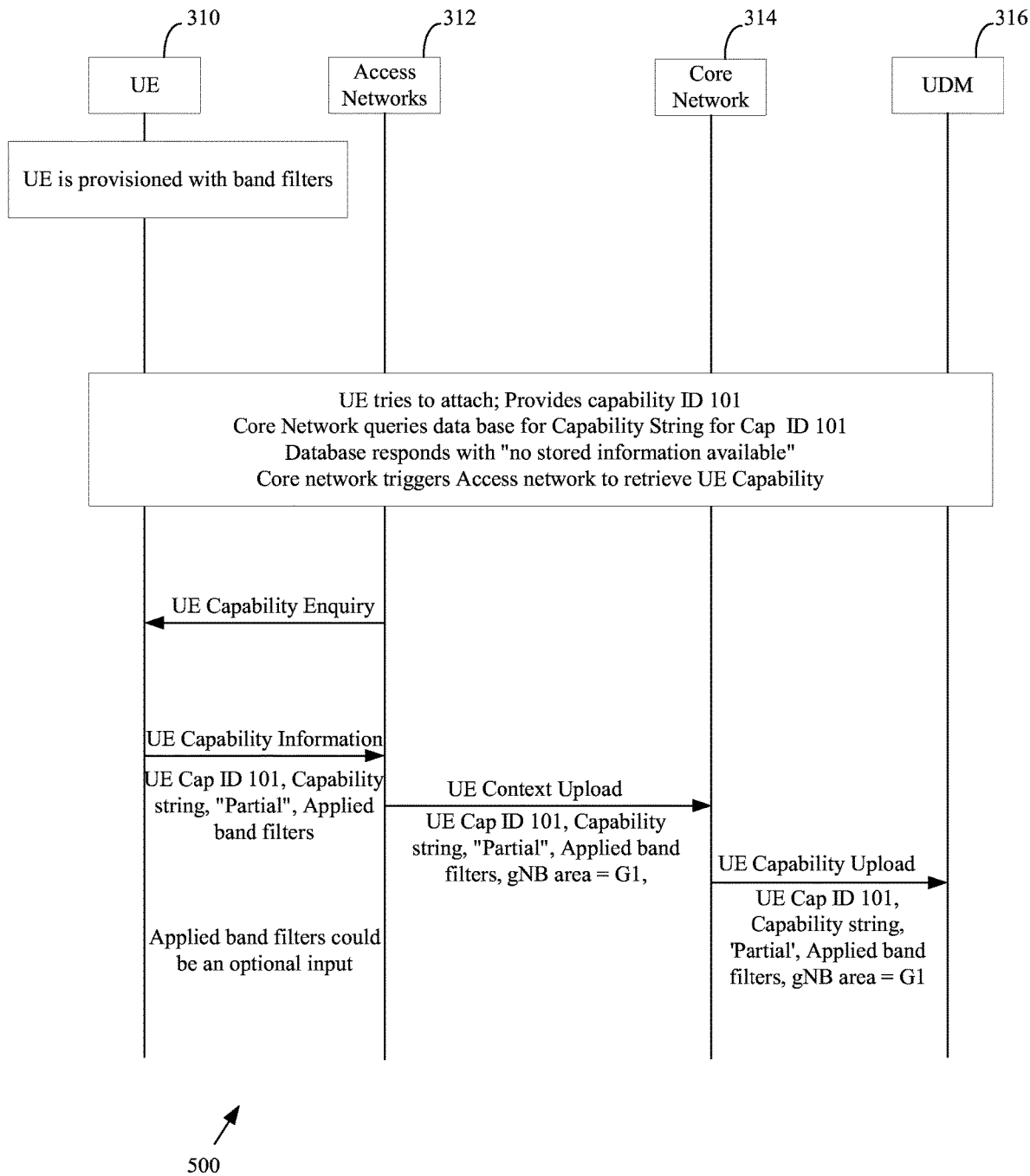
FIG. 5 is a diagram of a partial tag added by the UE in accordance with one or more embodiments.

FIG. 5 is a diagram of a partial tag added by the UE in accordance with one or more embodiments will be discussed. FIG. 5 shows a third embodiment 500 wherein the UE 310 is provisioned with the band filters. This configuration can be pre-provisioned by the operator through the device manufacturer or can be self-acquired by the UE 310, for example by learning from the band filter configuration from one or more of various system information blocks (SIBs).

In embodiment 500, the UE capability enquiry does not contain any band filters. The UE 310, while reporting its capabilities, can include the "partial" tag to let the network know UE 310 has applied band filters while preparing the UE capability information. As an additional embodiment, UE 310 can also include the applied band filters. The access network 312 can then add the geographical area metadata. In an alternative to embodiment 500, the core network 314 can add the geographical area metadata while uploading the UE capability information to the database, for example to UDM server 216.

Figure 6:
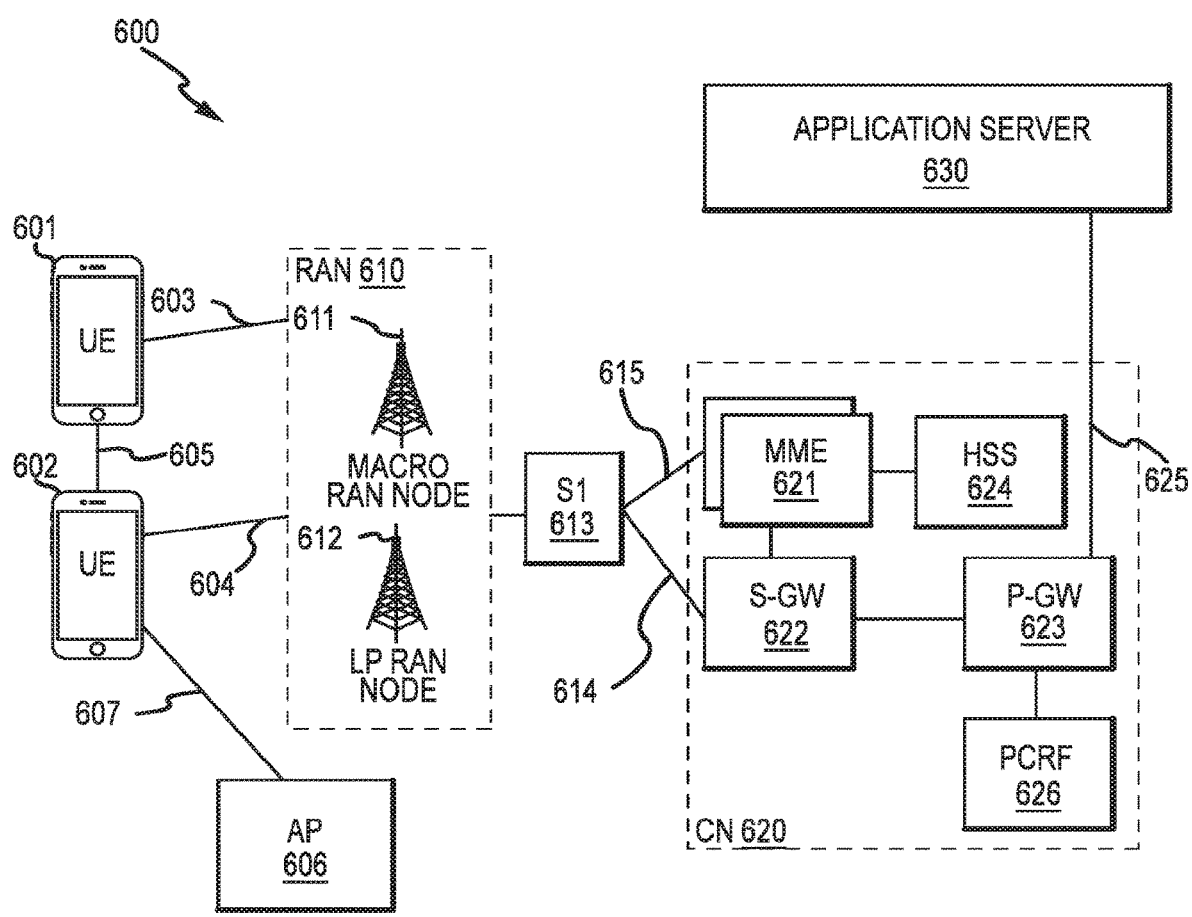
FIG. 6 illustrates an architecture of a system of a network in accordance with some embodiments.

FIG. 6 illustrates an architecture of a system 600 of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi®) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 and 612 to the UEs 601 and 602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S1 interface 613. In embodiments, the CN 620 may be an evolved packet core (EPC) network, a NextGen Packet Core (NPC) network, or some other type of CN. In this embodiment the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Enforcement Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

Figure 7:
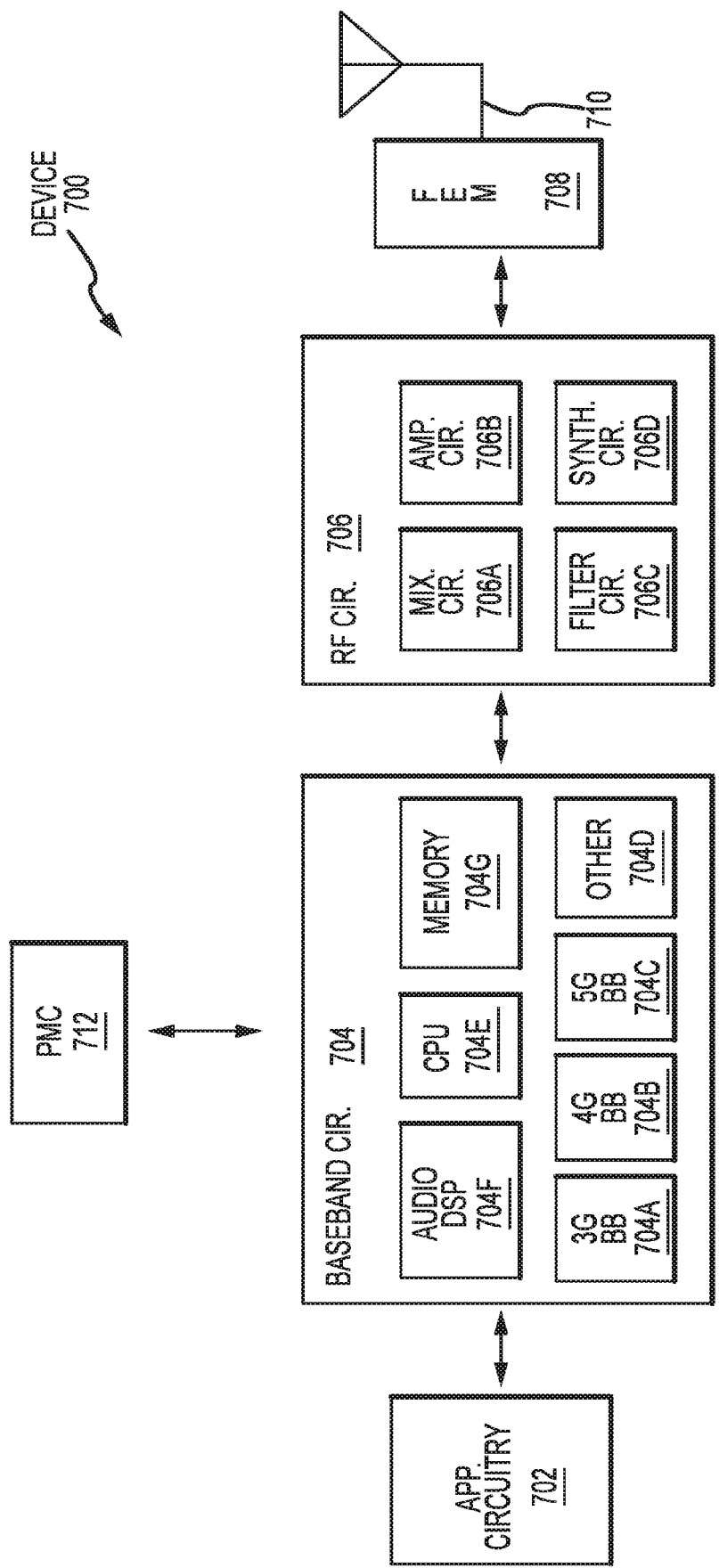
FIG. 7 illustrates example components of a device in accordance with some embodiments.

FIG. 7 illustrates example components of a device 700 in accordance with some embodiments. In some embodiments, the device 700 may include application circuitry 702, baseband circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE or a RAN node. In some embodiments, the device 700 may include less elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuity 704 may interface with the application circuitry 702 for generation and processing of the baseband signals and for controlling operations of the RF circuitry 706. For example, in some embodiments, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 704 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect. In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage-controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM 708, or in both the RF circuitry 706 and the FEM 708.

In some embodiments, the FEM circuitry 708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device is included in a UE. The PMC 712 may increase the power conversion efficiency while providing desirable implementation size and heat dissipation characteristics.

While FIG. 7 shows the PMC 712 coupled only with the baseband circuitry 704. However, in other embodiments, the PMC 712 may be additionally or alternatively coupled with, and perform similar power management operations for, other components such as, but not limited to, application circuitry 702, RF circuitry 706, or FEM 708.

In some embodiments, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX)

after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used execute Layer 3, Layer 2, or Layer 1 functionality, while processors of the application circuitry 704 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

The following are example implementations of the subject matter described herein. In a first example, an apparatus of a node of an access network, comprises one or more baseband processors to process a first user equipment (UE) capability report from a first UE, and to process a second UE capability report from a second UE, wherein the first UE capability report and the second UE capability report include a same UE capability ID for the first UE and the second UE, and wherein the first capability report includes partial UE capability information for the first UE and the second capability report includes partial UE capability information for the second UE. The apparatus can include a memory to store the first capability report and the second capability report. In a second example, an apparatus of a node of a core network comprises one or more baseband processors to process a first user equipment (UE) capability report from a first UE, and to process a second UE capability report from a second UE, wherein the first UE capability report and the second UE capability report include a same UE capability ID for the first UE and the second UE, and wherein the first capability report includes partial UE capability information for the first UE and the second capability report includes partial UE capability information for the second UE. The apparatus can include a memory to store the first capability report and the second capability report. In a third example, an apparatus of a node of a user equipment (UE) comprises one or more baseband processors to send a first user equipment (UE) capability report to an access network, wherein the first UE capability report includes a same UE capability ID as a capability ID in a second UE capability report sent by a second UE to the access network, and wherein the first capability report includes partial UE capability information for the first UE and the second capability report includes partial UE capability information for the second UE. The apparatus can include a memory to store the first UE capability report. In a fourth example, one or more machine readable media have instructions stored thereon that, when executed by an apparatus of a node of a core network, result in processing a first user equipment (UE) capability report from a first UE, and processing a second UE capability report from a second UE, wherein the first UE capability report and the second UE capability report include a same UE capability ID for the first UE and the second UE, and wherein the first capability report includes partial UE capability information for the first UE and the second capability report includes partial UE capability information for the second UE.

Although the claimed subject matter has been described with a certain degree of particularity, it should be recognized that elements thereof may be altered by persons skilled in the art without departing from the spirit and/or scope of claimed subject matter. It is believed that the subject matter pertaining to self-learning user equipment (UE) capability verification from partial reported capabilities and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a node of an access network, comprising:
   radio frequency circuitry configured to communicate with a first user equipment (UE) and a second UE; and
   one or more baseband processors communicatively coupled to the radio frequency circuitry and configured to perform operations comprising:
   processing a first UE capability report from the first UE;
   processing a second UE capability report from the second UE, wherein the first UE capability report and the second UE capability report include a same UE capability ID for the first UE and the second UE;
   sending the UE capability ID to a core network node;
   receiving a first request from the core network node to retrieve capabilities from at least one of the first UE and the second UE;
   sending, to at least one of the first UE and the second UE, a second request to provide the respective UE capabilities using a band filter associated with a public land mobile network (PLMN);
   receiving, from at least one of the first UE and the second UE, a respective further UE capability report including a partial UE capability information compiled using the band filter associated with the PLMN and a partial tag added by the one or more baseband processors; and
   tagging each respective further UE capability report with one of multiple geographical areas within the PLMN from which the respective further UE capability information was retrieved.

2. The apparatus of claim 1, wherein
each respective further UE capability report comprises the UE capability report ID and partial UE capability information compiled using the band filter associated with the PLMN.

3. The apparatus of claim 2, wherein each respective further UE capability report comprises a group of common parameters and a group of disjoint parameters, wherein the common parameters are compared, and the disjoint parameters are merged to create combined UE capabilities information.

4. The apparatus of claim 2, wherein the respective further UE capability reports include an indication of any filter applied when encoding the UE capability information.

5. The apparatus of claim 1, wherein the one or more baseband processors are to add a partial tag to each respective further UE capability report.

6. A node of a core network configured to perform operations, comprising:
processing a first user equipment (UE) capability report from a first UE;
processing a second UE capability report from a second UE, wherein the first UE capability report and the second UE capability report include a same UE capability ID for the first UE and the second UE;
determining the core network does not have a record of the UE capability ID;
sending, to an access network, a request to retrieve capabilities from the first UE and second UE using a band filter associated with a public land mobile network (PLMN) in response to determining the core network does not have a record of the UE capability ID;
processing a first further UE capability report including a partial UE capability information compiled using the band filter associated with the PLMN and a partial tag added by one or more baseband processors of an apparatus of a node of the access network from the first UE;
processing a second further UE capability report including a partial UE capability information compiled using the band filter associated with the PLMN and a partial tag added by the one or more baseband processors of the apparatus of the node of the access network from the second UE;
tagging each of the further UE capability report with one of multiple geographical areas within the PLMN from which the respective further UE capability information was retrieved; and
storing the each further UE capability in a database.

7. The node of claim 6, wherein
each further UE capability report comprises a group of common parameters and a group of disjoint parameters, wherein the UE capability ID reports include a partial tag indicating the reports include partial UE capability information.

8. The node of claim 7, wherein the common parameters are compared, and the disjoint parameters are merged to create combined UE capabilities information.

9. The node of claim 6, wherein validation of the UE capability information per geographical area is performed separately.

10. The node of claim 7, wherein the respective further UE capability reports include an indication of any filter applied when encoding the UE capability information.

11. The node of claim 6, the operations further comprising:
adding a partial tag to each further UE capability report.

12. The apparatus of claim 1, further comprising:
sending, after tagging each respective further UE capability report with one of multiple geographical areas within the PLMN, the respective further UE capability reports to the core network node.

13. The apparatus of the claim 1, wherein the core network node is an access mobility management function (AMF) of the core network.

14. The apparatus of claim 1, wherein the band filter associated with the PLMN is provided by a network operations and maintenance center.

15. The node of claim 6, wherein tagging each further UE capability report with one of multiple geographical areas within the PLMN from which the respective further UE capability information was retrieved is based on a base station from which the further UE capability report was received.

* * * * *